United States Patent
Shetty

(10) Patent No.: US 9,922,176 B2
(45) Date of Patent: Mar. 20, 2018

(54) BORROWING SOFTWARE LICENSES IN A LICENSE MANAGEMENT SYSTEM FOR TIME BASED USAGE

(71) Applicant: International Business Machines Corporation, Armonk, NY (US)

(72) Inventor: Deviprasad I. Shetty, Mangalore (IN)

(73) Assignee: International Business Machines Corporation, Armonk, NY (US)

(*) Notice: Subject to any disclaimer, the term of this patent is extended or adjusted under 35 U.S.C. 154(b) by 206 days.

(21) Appl. No.: 14/884,921

(22) Filed: Oct. 16, 2015

(65) Prior Publication Data
US 2017/0109506 A1    Apr. 20, 2017

(51) Int. Cl.
*G06F 21/00* (2013.01)
*G06F 21/10* (2013.01)
*G06F 17/30* (2006.01)

(52) U.S. Cl.
CPC ...... *G06F 21/105* (2013.01); *G06F 17/30091* (2013.01); *G06F 2221/0771* (2013.01); *G06F 2221/2137* (2013.01)

(58) Field of Classification Search
CPC .......................... G06F 17/30091; G06F 21/105
USPC ...................................................... 726/26–30
See application file for complete search history.

(56) References Cited

U.S. PATENT DOCUMENTS

| | | | |
|---|---|---|---|
| 6,915,278 B1 | 7/2005 | Ferrante et al. | |
| 7,231,360 B2 | 6/2007 | Sy | |
| 7,818,259 B2 | 10/2010 | Moritzen | |
| 2008/0215468 A1 | 9/2008 | Monsa-Chermon et al. | |
| 2009/0222926 A1 | 9/2009 | Pavan et al. | |
| 2009/0254482 A1 | 10/2009 | Vadlamani et al. | |
| 2012/0254024 A1 | 10/2012 | Bose et al. | |
| 2013/0111355 A1* | 5/2013 | Jennings | H04L 12/1822 715/753 |
| 2014/0366150 A1* | 12/2014 | Fang | G06F 21/105 726/26 |

OTHER PUBLICATIONS

Gurobi, "Gurobi Cloud," Gurobi Optimization Products, p. 1-2, http://www.gurobi.com/products/gurobi-cloud, Accessed on Sep. 7, 2015.
Mell et al., "The NIST Definition of Cloud Computing," National Institute of Standards and Technology, Sep. 2011, p. 1-3, Special Publication 800-145.

* cited by examiner

*Primary Examiner* — Anthony Brown
(74) *Attorney, Agent, or Firm* — Michael O'Keefe

(57) ABSTRACT

According to one embodiment, a method for borrowing licenses. The method may include retrieving a license file associated with a software program from a data storage device, whereby the license file includes a plurality of borrowing information. The method may also include recording a plurality of usage information to the data storage device based on a plurality of user interactions with the software program. The method may further include updating the plurality of borrowing information within the retrieved license file using the recorded plurality of usage information. The method may also include revoking the retrieved license file based on the updated plurality of borrowing information expiring.

17 Claims, 6 Drawing Sheets

BORROWING SOFTWARE LICENSES IN A LICENSE MANAGEMENT SYSTEM FOR TIME BASED USAGE

FIELD OF INVENTION

The present invention relates generally to the field of computing, and more particularly to license management systems.

BACKGROUND

A license management system, or license manager, may be a tool utilized by software vendors or end-user organizations to control the licensing of software applications. A license manager, such as IBM License Use Management® (LUM) (IBM LUM and all IBM LUM-based trademarks and logos are trademarks or registered trademarks of International Business Machines Corporation and/or its affiliates) may be used as a tool within a software asset manager. License management systems may prevent piracy and other unauthorized uses of software in order to protect software license agreements. Software licensing systems may implement various licensing models, such as product activation, trail licenses, subscription licenses, feature-based licenses, and floating licensing.

SUMMARY

According to one embodiment, a method for borrowing licenses. The method may include retrieving a license file associated with a software program from a data storage device, whereby the license file includes a plurality of borrowing information. The method may also include recording a plurality of usage information to the data storage device based on a plurality of user interactions with the software program. The method may further include updating the plurality of borrowing information within the retrieved license file using the recorded plurality of usage information. The method may also include revoking the retrieved license file based on the updated plurality of borrowing information expiring.

According to another embodiment, a computer system for borrowing licenses. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The computer system may include retrieving a license file associated with a software program from a data storage device, whereby the license file includes a plurality of borrowing information. The computer system may also include recording a plurality of usage information to the data storage device based on a plurality of user interactions with the software program. The computer system may further include updating the plurality of borrowing information within the retrieved license file using the recorded plurality of usage information. The computer system may also include revoking the retrieved license file based on the updated plurality of borrowing information expiring.

According to yet another embodiment, a computer program product for borrowing licenses. The computer program product may include one or more computer-readable storage devices and program instructions stored on at least one of the one or more tangible storage devices, the program instructions executable by a processor. The computer program product may include program instructions to retrieve a license file associated with a software program from a data storage device, whereby the license file includes a plurality of borrowing information. The computer program product may also include program instructions to record a plurality of usage information to the data storage device based on a plurality of user interactions with the software program. The computer program product may further include program instructions to update the plurality of borrowing information within the retrieved license file using the recorded plurality of usage information. The computer program product may also include program instructions to revoke the retrieved license file based on the updated plurality of borrowing information expiring.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description.

DETAILED DESCRIPTION

Figure 1:
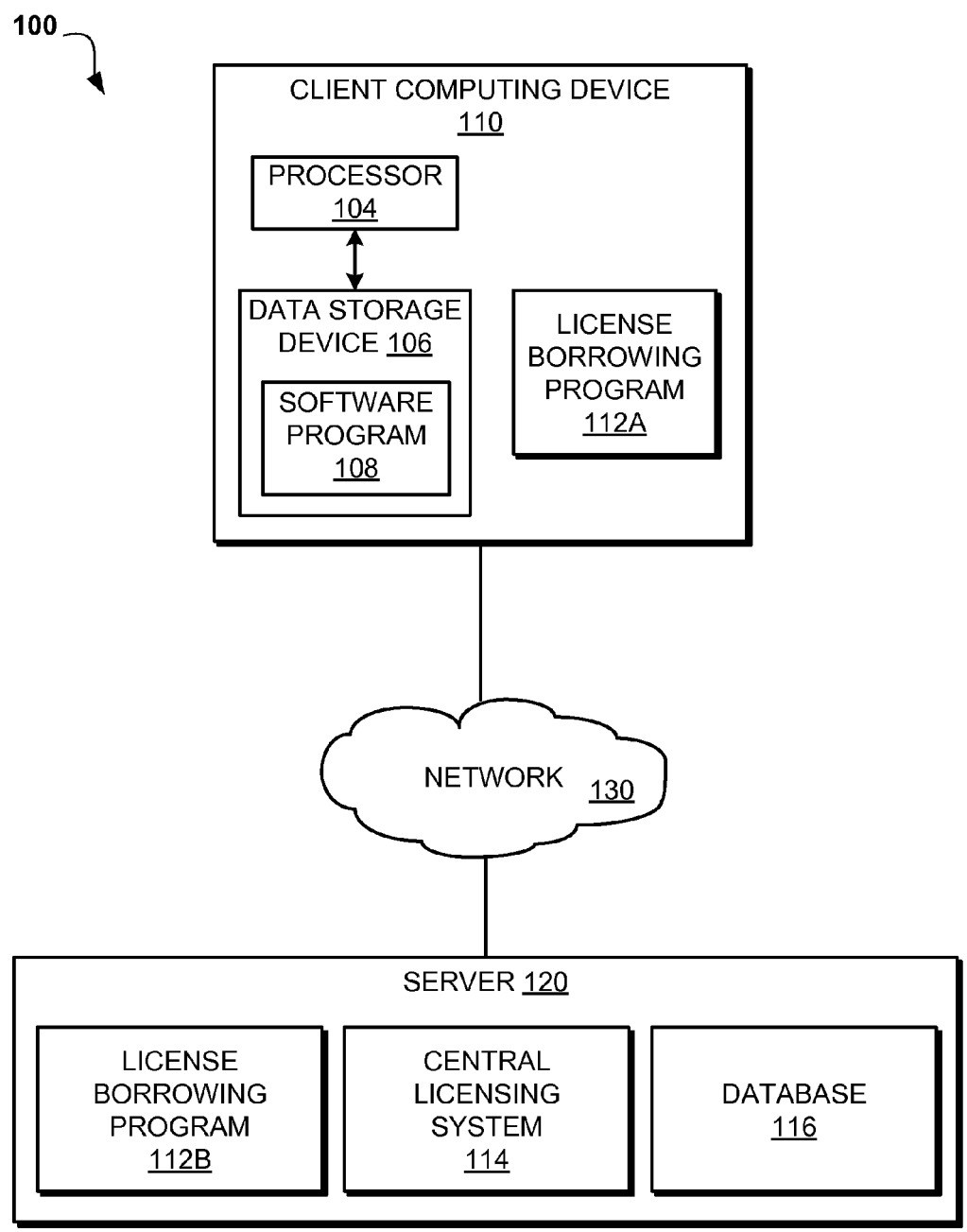
FIG. 1 is an exemplary networked computer environment, in accordance with one embodiment of the present invention.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention are related to the field of computing, and more particularly to license management systems. The following described exemplary embodiments provide a system, method, and program product to, among other things, manage borrowed software licenses based on a determined borrowing period when a user device is not connected to a central licensing system. Therefore, the present embodiment has the capacity to improve the technical field of license management systems by allowing the use of borrowed software licenses offline when a user device is not connected to a central licensing system for a predetermined period of time for which the license is needed. Therefore, the encumbering of licenses for the entire borrowing period may be prevented.

As previously described, a license management system, or license manager, may be a tool utilized by software vendors or end-user organizations to control the licensing of software applications. Many software licensing systems may implement various licensing models, such as node locked licensing, floating licensing, and user-based licensing (i.e. concurrent user licensing). Node locked licensing may refer to a licensing model where each license is assigned a key specifically tied to a computing device. Therefore, a user may not need to be connected to a license manager in order to use the license. However, in node locked licensing, the license may not be borrowed and used on other devices, since the license is paired with a specific device.

User-based licensing, or concurrent user licensing, may refer to a licensing model where a limit is placed on the number of simultaneous users within a network accessing an application. For example, if an organization has 40 employees and 30 licenses for a particular application and all 30 licenses are in use by 30 of the organization's employees, another employee wishing to use the application must wait until an employee currently using the application exits the application before one of the encumbered licenses is made available.

Floating licensing may refer to a license system that allows users on a network to borrow individual licenses from a commonly shared library of licenses. When a user borrowing a license finishes use of that license, the borrowed license is returned to the library. Within a floating licensing model, some license managers may allow licenses to be borrowed in various forms, such as based on time or based on specific features needed by the requester. For example, if a user only needs to use a specific feature within a program, the user may be able to borrow a license for use with only that specific feature. Similarly, if a user only needs to borrow a license for a specific period of time and not in perpetuity, then the license manager may allocate a license to that user for the desired period of time. Upon expiration of that time, the user's access to the application granted by the borrowing of the license may be revoked and the license may be returned to the license library from which it was borrowed.

Furthermore, a hybrid of floating licensing and locked node licensing system may exist to allow users to borrow licenses from a central library and terminate the network connection to the license manager in order to use the application offline. While a user borrowing a license is offline, the license temporarily converts to a locked node model and ties the license to the specific device that was connected to the license manager before the network connection was terminated. When the user re-establishes the network connection, the license may be transferred to a different user device or returned to the central library.

While pooling licenses owned by an organization in a central library for distribution to users may be an effective license management system, challenges may be encountered since users may be required to keep an active network connection to the license manager to continue using the application for which a license was borrowed, such as in a floating licensing model. Some license managers and license delivery systems may provide options for users to borrow licenses without an active network connection, such as a locked node licensing model. However, many license managers and delivery systems require an entire license to be encumbered while a borrowing user is offline irrespective of the number of hours for which the borrowed license is actually used or needed. As such, it may be advantageous, among other things, to implement a license delivery system that allows a user to borrow a license for a specific period of time and only encumber the license for a fraction of the entire period of time within which the license is borrowed.

According to one embodiment, a "pre-paid" licensing system with time-based license usage may be implemented to allow a user to utilize a licensed product offline while encumbering the license within the license library of the license delivery system for less than the entire period with which the user borrows the license. For example, if a user borrows a license for a 24 hour period but only actually needs to use the license for two hours within that 24 period, the license management system may encumber one whole license for a two hour usage period over the next 24 hours rather than encumber the entire license for the entire 24 hour borrowing period. Therefore, licenses may be available for borrowing by other users during the 24 hour borrowing period where the license is not actually in user by the borrowing user.

When a user requests to borrow a license from a license library, the amount of time for which the user wishes to borrow the license may be designated. A license file may then be downloaded to the user device on which the corresponding product may be installed. The license file may include system identification information corresponding to the borrowing machine and/or the borrowing user, the preconfigured borrowing time, and other relevant information, such as an expiration date or time. When the user executes the licensed application offline without connecting to the central license delivery system, the user may assign the downloaded license file as a destination for the application to fetch licenses. The total user time usage of the application may be recorded by the license library. The license file may be updated with the recorded usage time by the license library and revoke user access to the license when the preconfigured time within the license file expires or upon the end of a "due date" that a system administrator or the user designates that the license is revoked.

Furthermore, with respect to managing borrowed licenses within the central license management system, the preconfigured time for which the license is borrowed may be encumbered within the license management system using a peak/off-peak method. To avoid licenses borrowed during off-peak hours of operation from being used during peak hours of operation, the license management system may include a tag on a license that only allows license operation during off-peak hours.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to manage software licenses based on a determined borrowing period when a user device is not connected to a central licensing system. According to at least one implementation, a central licensing system may manage the distribution of licenses to disconnected user devices by allocating a preconfigured borrowing time to a license file at the time the license is borrowed. The central licensing management system may distribute the preconfigured borrowing time across a period so that other users may borrow the license during the period. Additionally, a license may be assigned a tag associated with peak usage or off-peak usage, which may restrict license use to an appropriate time of day corresponding to when the license was first borrowed by the user.

Referring to FIG. 1, an exemplary networked computer environment 100 is depicted, in accordance with one embodiment. The networked computer environment 100 may include client computing device 110 and server 120 interconnected via communication network 130. According to at least one implementation, networked computer environment 100 may include a plurality of client computing devices 110 and server 120, only one of each being shown for illustrative brevity.

Communication network 130 may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 110 may include processor 104 and data storage device 106 that is enabled to run software program 108 and hosting license borrowing program 112A, and communicating with server 120 via network 130, in accordance with one embodiment of the invention. Client computing device 110 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, client computing device 110 may include internal components 402a and external components 404a, respectively.

Server computer 120, or database server, may be a laptop computer, netbook computer, personal computer (PC), a desktop computer, or any programmable electronic device capable of hosting license borrowing program 112B, central licensing system 114, database 116, and communicating with client computing device 110 via network 130, in accordance with embodiments of the invention. As will be discussed with reference to FIG. 4, server computer 120 may include internal components 402b and external components 404b, respectively. Server 120 may also operate in a cloud computing service model, such as Software as a Service (SaaS), Platform as a Service (PaaS), or Infrastructure as a Service (IaaS). Server 120 may also be located in a cloud computing deployment model, such as a private cloud, community cloud, public cloud, or hybrid cloud.

According to the present embodiment, license borrowing program 112A, 112B may be a program capable of generating and distributing a license file that includes a designated amount of time for which the license file may allow use of an application. License borrowing program 112A, 112B is explained in further detail below with respect to FIG. 2 and FIG. 3.

Central licensing system 114 may be a program capable of managing licenses. Central licensing system 114 may include the distribution and receipt of borrowed licenses from users. Central licensing system 114 may include compatibility with various licensing models, such as floating licensing models, locked node licensing models, user-based licensing models, or hybrid licensing models.

Database 116 may be a repository, such as a license library, capable of storing one or more licenses managed by central licensing system 114. Database 116 may also be capable of storing license files generated by license borrowing program 112A, 112B prior to distribution to client computing device 110.

Figure 2:
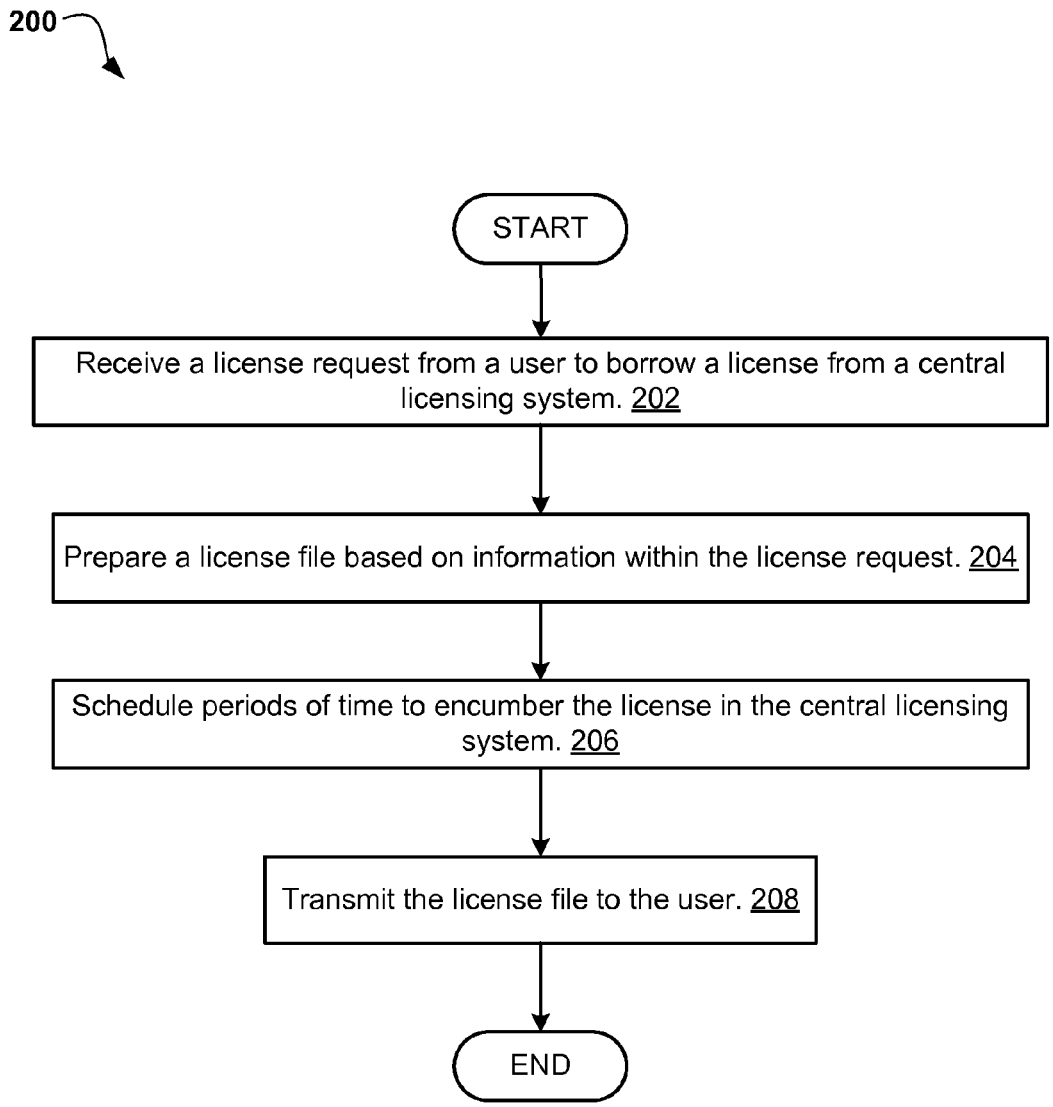
FIG. 2 illustrates a flowchart of the operational steps carried out by a program to borrow software licenses in a license management system for time-based usage, in accordance with one embodiment of the present invention.

Referring now to FIG. 2, a flowchart 200 of the operational steps carried out by a program to borrow software licenses in a license management system for time-based usage is depicted, in accordance with one embodiment of the present invention. At 202, license borrowing program 112A, 112B may receive a license request from a user to borrow a license from central licensing system 114. When a user wishes to borrow a license from central licensing system 114, the user may submit a license request to license borrowing program 112A, 112B. When submitting the license request, the user may include borrowing information, such as the total usage time the requested license may be used offline, the date and time the user will return the requested license, the scope of the license requested, the expiration date and time at which the license may be revoked, and whether the requested license will be used during peak or off-peak hours. The user may submit the borrowing information to license borrowing program 112A, 112B through a graphical user interface on client computing device 110. Regarding the expiration date and time, a user may borrow a requested license for a specific time period preconfigured by a system administrator. Therefore, upon the expiration of the preconfigured time period, central licensing system 114 may revoke the borrowed license from the user.

Next at 204, license borrowing program 112A, 112B may prepare a license file that includes the user submitted borrowing information. Once the borrowing information has been submitted for a user, license borrowing program 112A, 112B may enter the borrowing information to a license file so that the license file includes the borrowing information. For example, if a user submits a license request to actively use a license for two hours with a borrowing period of 24 hours, then license borrowing program 112A, 112B may include this borrowing information in the license file. Therefore, once the license file is received by client device 110 and client device 110 is subsequently disconnected from central licensing system 114, license borrowing program 112A, 112B may determine the remaining borrowing time or the remaining borrowing period for the user to utilize the license before the license is revoked.

In another embodiment of the present invention, license borrowing program 112A, 112B may add usage restriction for borrowed license files by including tags on the borrowed license files so that a license may only be used under certain circumstances. For example, if a license is borrowed during off-peak hours, license borrowing program 112A, 112B may tag the license file for use only during off-peak hours. Therefore, the borrowed license may not be used during peak usage hours so as to prevent misuse of borrowed licenses.

Then at 206, license borrowing program 112A, 112B encumbers, or "checks out", the borrowed license within central licensing system 114 corresponding to the borrowing information within the user submitted license request. As previously described, license borrowing program 112A, 112B may allow for a "pre-paid" licensing system with time-based license usage that allows a user to utilize a licensed product offline. In order to account for offline usage without encumbering an entire license for the whole usage period, license borrowing program 112A, 112B may encumber a license within central licensing system 114 for a period of time that is less than the entire borrowing period. For example, if a user needs to use software program 108 for one hour each day for the next 5 days, the user may submit a license request to borrow a license for software program 108. In the submitted license request, the user may indicate the borrowing period as 5 days and the usage period as 5 hours since the user needs to use the application for one hour on each day of the borrowing period. Therefore, license borrowing program 112A, 112B may encumber the borrowed license within central licensing system for the five hours of the usage period rather than the 5 days of the borrowing period. Furthermore, if a borrowed license has a restriction based on the borrowing information, such as off-peak usage only, then license borrowing program 112A, 112B may encumber the borrowed license based on the restriction. For example, if a borrowed license will only be used during off-peak hours, license borrowing system 112A, 112B may only encumber the borrowed license in central licensing system 114 during off-peak hours since the borrowing user may not be able to use the license during peak hours. Upon expiration of the encumbering period, license borrowing program 112A, 112B may unencumber the borrowed license within central licensing system 114 and return the encumbered license to the license pool.

Then at 208, license borrowing program 112A, 112B may transmit the license file to client computing device 110 associated with the user. Once the license file is prepared by license borrowing program 112A, 112B, license borrowing program 112A, 112B may transmit the license file to client computing device 110. In order for the user requesting the license file to actually use the license, specifically for offline use of the license, the license file may need to be transmitted on client device 110.

Figure 3:
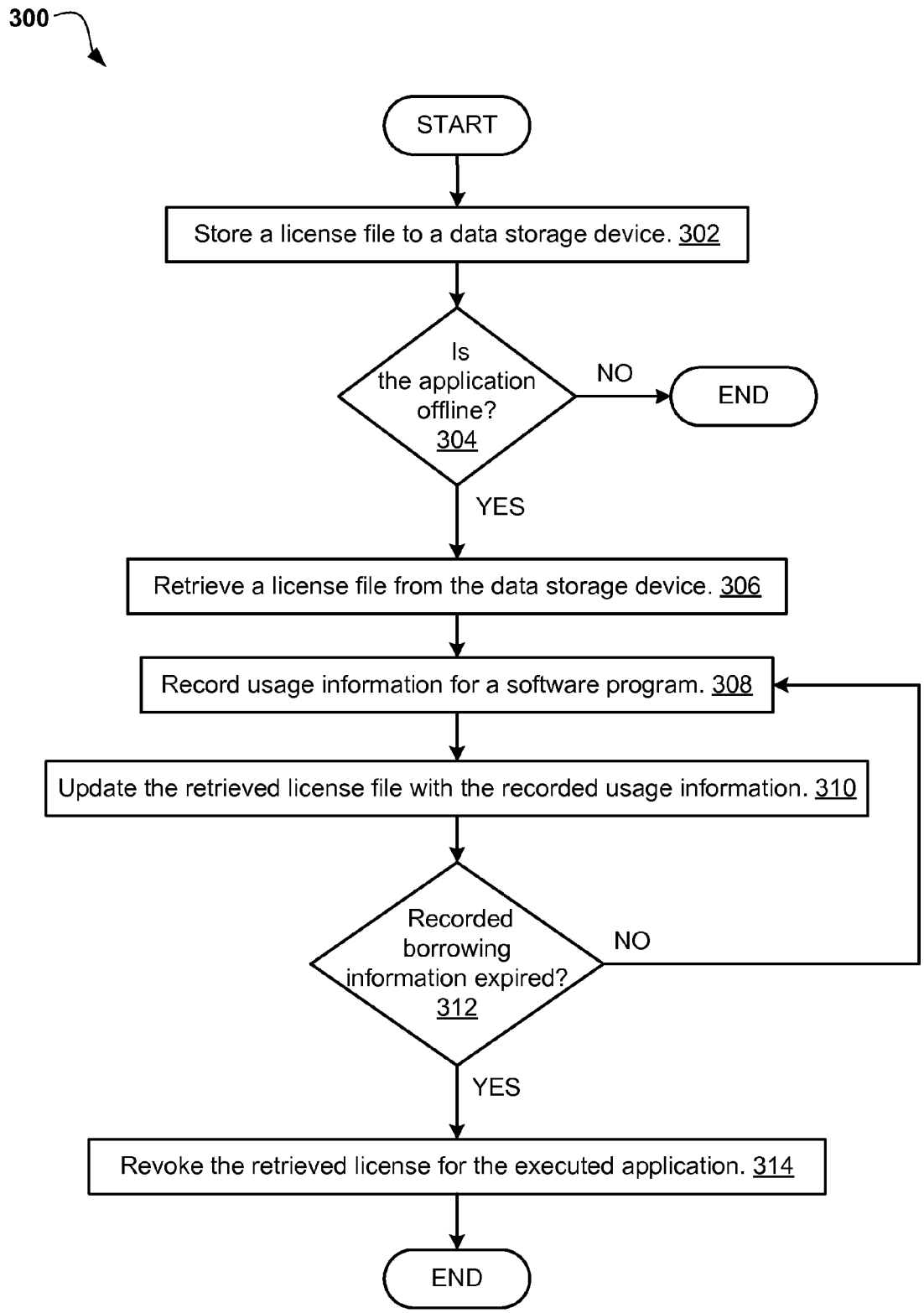
FIG. 3 illustrates a flowchart of the operational steps carried out by a program to manage time-based usage of borrowed licenses, in accordance with one embodiment of the present invention.

Referring now to FIG. 3, a flowchart 300 of the operational steps carried out by a program to manage time-based usage of borrowed licenses is depicted, in accordance with one embodiment of the present invention. At 302, license borrowing program 112A, 112B may store a license file within data storage device 106 once the license file is received from central licensing system 114. Since the received license file may contain borrowing information applicable to the license's usage, such as the total usage time the requested license may be used offline, the date and time the user will return the requested license, the scope of the license requested, and whether the requested license will be used during peak or off-peak hours, license borrowing program 112A, 112B may save the received license file to data storage device 106 when a license file is received from central licensing system 114.

Next at 304, once a user executes software program 108, which may require a license, license borrowing program 112A, 112B may determine if client computing device 110 is connected to network 130. According to one implementation, the method may continue along operational flowchart 300, if the client computing device 110 is not connected to network 130. If license borrowing program 112A, 112B determines client computing device 110 is not connected to network 130 (step 304, "YES" branch), license borrowing program 112A, 112B may continue to step 306 to retrieve a license file. If license borrowing program 112A, 112B determines client computing device 110 is connected to network 130 (step 304, "NO" branch), the method may terminate, since license borrowing program 112A, 112B may be connected to central licensing system 114 and, therefore, may obtain licenses and track license usage without a need for offline capabilities.

Then at 306, when license borrowing program 112A, 112B determines client computing device 110 is not connected to network 130, license borrowing program 112A, 112B may retrieve a license file from data storage device 106. Upon execution of software program 108 and determination that client computing device 110 is not connected to network 130, license borrowing program 112A, 112B may locate the license file corresponding to the executed application saved on data storage device 106 and execute software application 108 using the located license file.

Next at 308, license borrowing program 112A, 112B may record usage information of software program 108 using the retrieved license file. As previously described, the retrieved license file may include borrowing information, such as the total time the requested license may be used offline, the date and time the user will return the requested license, the scope of the license requested, and whether the requested license will be used during peak or off-peak hours. Therefore, as a user utilizes software program 108, license borrowing program 112A, 112B may record usage information, such as the amount of time software program 108 is open and the current date and time according to the clock settings of client computing device 110. For example, when a user opens software program 108, license borrowing program may record the current date and time according to the clock settings of client computing device 110 as well begin actively tracking the amount of time software application 108 is open.

Then at 310, license borrowing program 112A, 112B may update the license file using the recorded usage information. Once recorded, license borrowing program 112A, 112B may update the license file with the most updated information to reflect the current usage status of the license. For example, in the previously described example where a user borrows a license for two hours of active usage over a 24 hour period, license borrowing program 112A, 112B may update the license file after a corresponding software program has been used for one hour of the two hour active borrowing time. Therefore, once updated by license borrowing program 112A, 112B, the license file may indicate that one hour of active borrowing time remains on the license. Additionally, license borrowing program 112A, 112B may also track the amount of time remaining in the borrowing period. For example, if a license is borrowed from central licensing system 114 for 24 hours and 15 hours have elapsed since the borrowing time, license borrowing program 112A, 112B may determine there is nine hours remaining in the borrowing period before the borrowed license is revoked.

Next at 312, license borrowing program 112A, 112B may determine if any item of borrowing information within the license file has expired. According to one implementation, the method may continue along operational flowchart 300, if an item of borrowing information has expired. If license borrowing program 112A, 112B determines an item of borrowing information has expired (step 312, "YES" branch), license borrowing program 112A, 112B may continue to step 314 to revoke the borrowed license for software application 108. If license borrowing program 112A, 112B determines no items of borrowing information have expired (step 312, "NO" branch), the method may return to step 308 to record usage information for software program 108.

Then at 314, license borrowing program 112A, 112B may revoke the license for software program 108. As previously described, when a user submits a request to borrow a license from central licensing system 114, the user may submit borrowing information, such as the total usage time the requested license may be used offline, the date and time the user will return the requested license, the scope of the license requested, the expiration date and time at which the requested license may be revoked, and whether the requested license will be used during peak or off-peak hours. Some items of borrowing information, such as the total usage time the requested license may be used offline, the expiration date and time, and the date and time the user will return the requested license, may expire after enough usage of software application 108 or through the elapse of time. Therefore, when license borrowing program 112A, 112B determines that recorded borrowing information has expired, license borrowing program 112A, 112B may revoke the borrowed license for software program 108 from the user. For example, if a user has borrowed a license from central licensing system 114 for a period of two active hours of use over a borrowing period of 24 hours, license borrowing program 112A, 112B may revoke the borrowed license from the user when license borrowing program 112A, 112B determines the user has used software program 108 for two full hours or the 24 hour borrowing period has expired. Similarly, if a system administrator establishes that a license may only be borrowed for one day regardless of how many usage hours a use may need, license borrowing program 112A, 112B may revoke user access to a borrowed license after the preconfigured one day expiration time.

Figure 4:
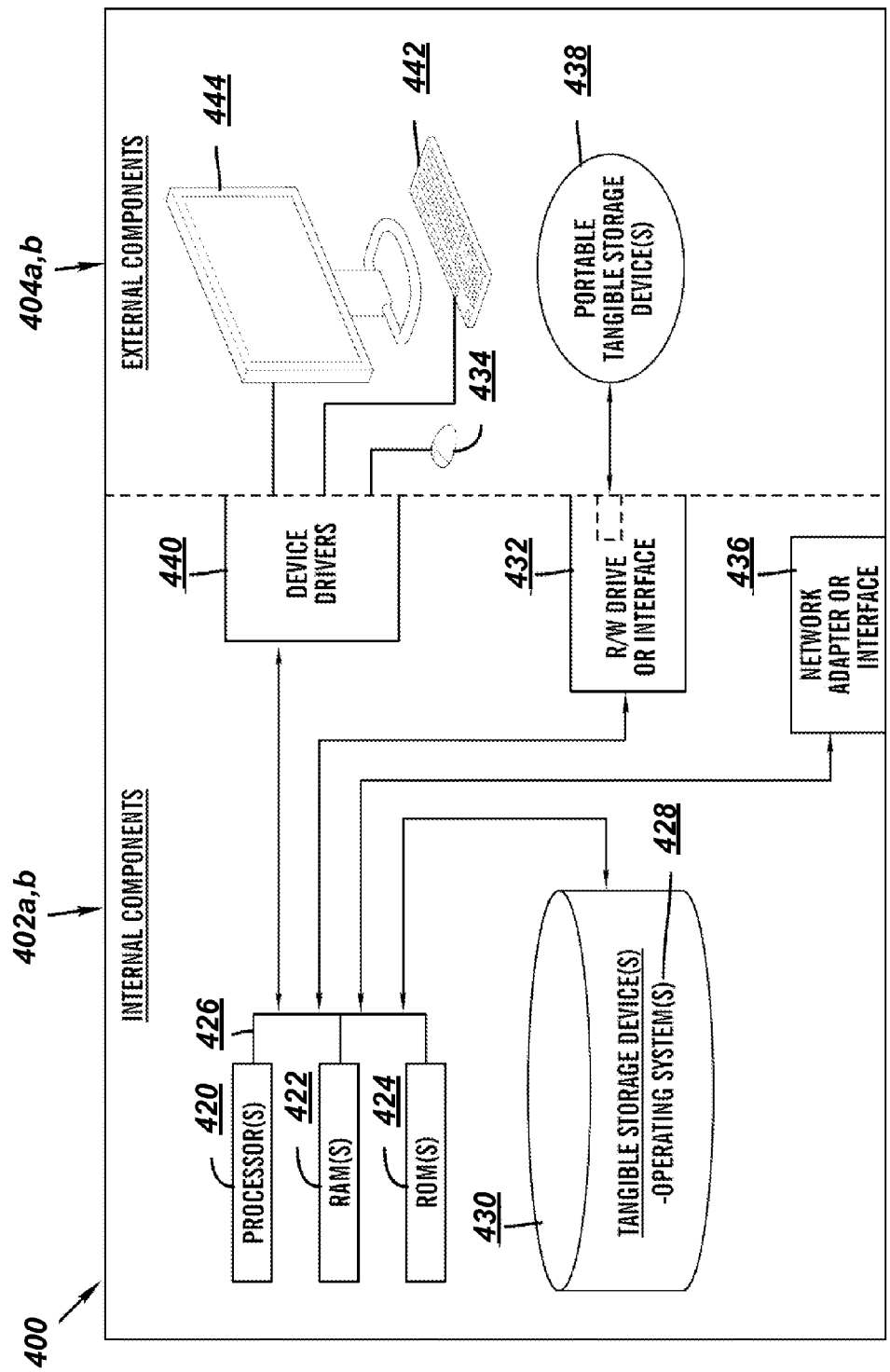
FIG. 4 is a block diagram of internal and external components of computers and servers depicted in FIG. 1 according to at least one embodiment.

FIG. 4 is a block diagram 400 of internal and external components of computer 110 and server 120 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 402, 404 is representative of any electronic device capable of executing machine-readable program instructions. Data processing system 402, 404 may be representative of a smart phone, a computer system, PDA, or other electronic devices. Examples of computing systems, environments, and/or configurations that may be represented by data processing system 402, 404 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 110 and network server 120 may include respective sets of internal components 402a, b and external components 404a, b illustrated in FIG. 4. Each of the sets of internal components 402 include one or more processors 420, one or more computer-readable RAMs 422 and one or more computer-readable ROMs 424 on one or more buses 426, and one or more operating systems 428 and one or more computer-readable tangible storage devices 430. The one or more operating systems 428, license borrowing program 112A in client computer 110; and license borrowing program 112B, central licensing system 114 and database 116 in network server 120 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402a, b also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as license borrowing program 112A, 112B, can be stored on one or more of the respective portable computer-readable tangible storage devices 438, read via the respective R/W drive or interface 432 and loaded into the respective hard drive 430.

Each set of internal components 402a, b also includes network adapters or interfaces 436 such as a TCP/IP adapter cards, wireless Wi-Fi interface cards, or 3G or 4G wireless interface cards or other wired or wireless communication links. License borrowing program 112A in client computer 110 and license borrowing program 112B, central licensing program 114, and database 116 in network server 120 can be downloaded to client computer 110 and network server 120 from an external computer via a network (for example, the Internet, a local area network or other, wide area network) and respective network adapters or interfaces 436. From the network adapters or interfaces 436, license borrowing program 112A in client computer 110 and license borrowing program 112B, central licensing system 114, and database 116 in network server 120 are loaded into the respective hard drive 430. The network may comprise copper wires, optical fibers, wireless transmission, routers, firewalls, switches, gateway computers and/or edge servers.

Each of the sets of external components 404a, b can include a computer display monitor 444, a keyboard 442, and a computer mouse 434. External components 404a, b can also include touch screens, virtual keyboards, touch pads, pointing devices, and other human interface devices. Each of the sets of internal components 402a, b also includes device drivers 440 to interface to computer display monitor 444, keyboard 442, and computer mouse 434. The device drivers 440, R/W drive or interface 432 and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
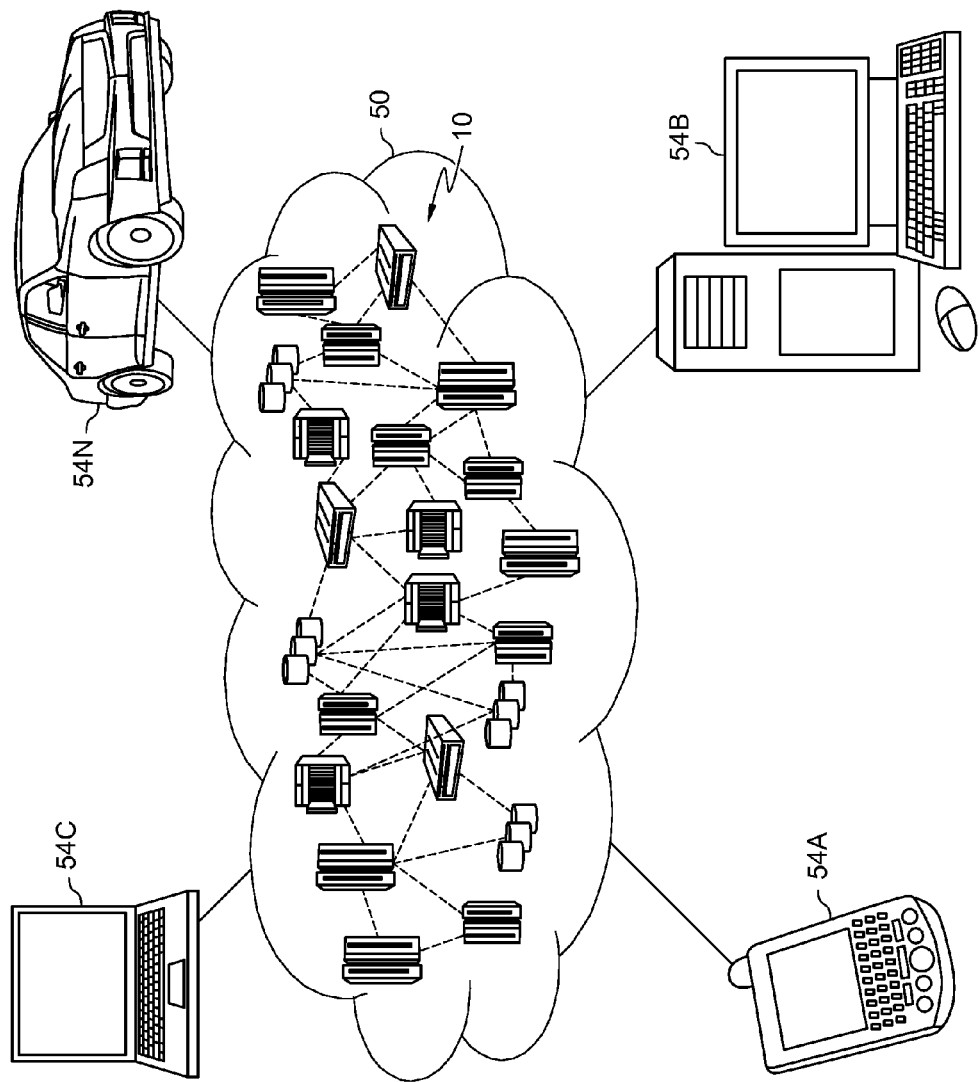
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
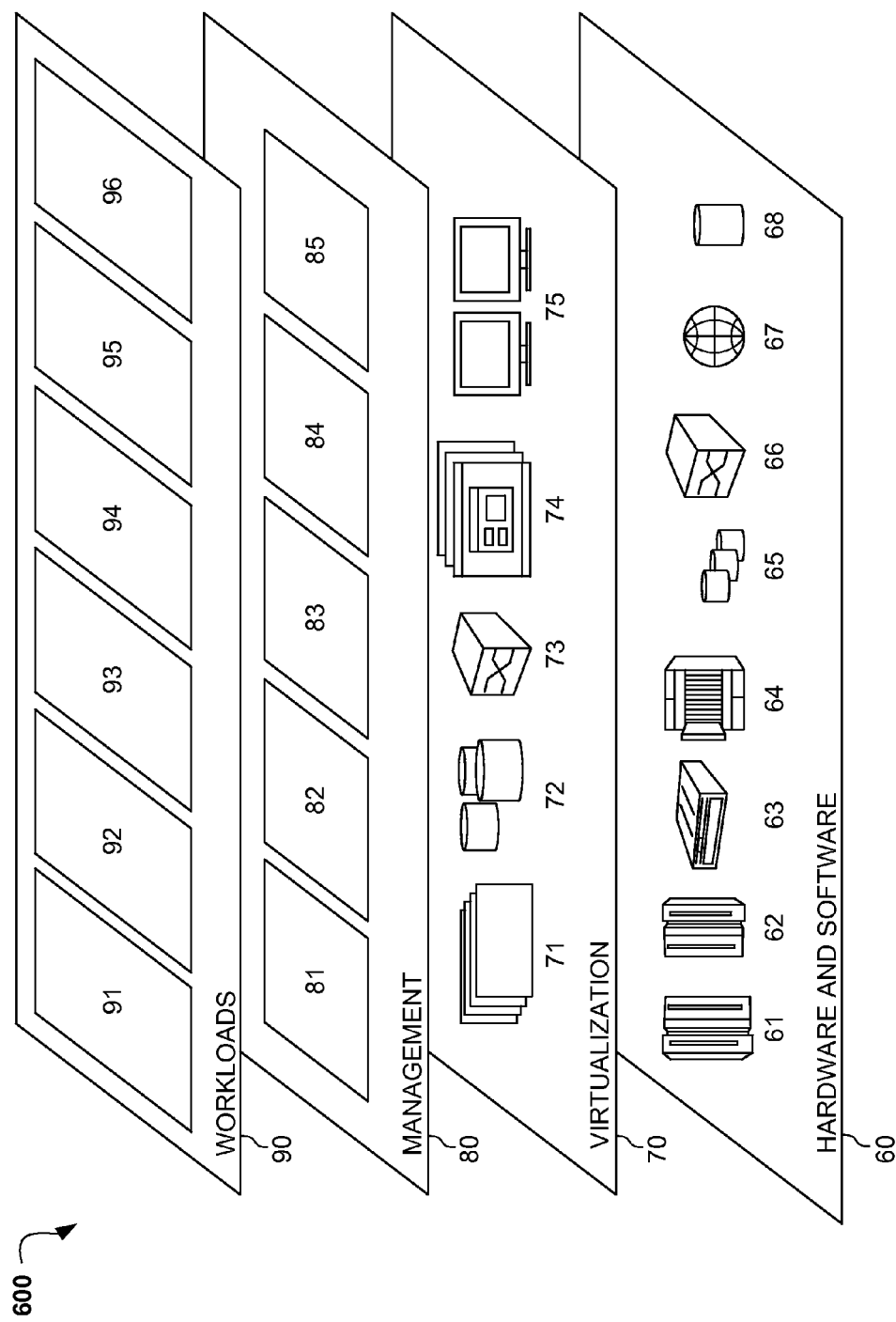
FIG. 6 depicts abstraction model layers according to an embodiment of the present invention.

Referring now to FIG. 6, a set of functional abstraction layers 600 provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and license borrowing 96. A license borrowing system may be capable allowing users to borrow licenses from a central licensing system and manage the allocation of time periods to encumber the borrowed licenses across the entire borrowing period. Also, a license borrowing system may be capable of distributing a license file that contains user borrowing information, which may allow a user to use a borrowed license offline.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for borrowing licenses, the method comprising:
    retrieving, by a processor, a license file associated with a software program from a data storage device, wherein the license file includes a plurality of borrowing information, wherein the plurality of borrowing information includes at least one of a total usage time a requested license will be used offline, a date and a time when a borrowing user will return the requested license, a scope of the requested license, an expiration date and an expiration time at which the requested license will be revoked, and a plurality of restriction criteria associated with the requested license;
    recording a plurality of usage information to the data storage device based on a plurality of user interactions with the software program;
    updating the plurality of borrowing information within the retrieved license file using the recorded plurality of usage information; and
    revoking the retrieved license file based on the updated plurality of borrowing information expiring.

2. The method of claim 1, further comprising:
    receiving the license file from a central licensing system; and
    storing the received license file in a data storage device.

3. The method of claim 1, wherein retrieving the license file is based on a determination that a computer hosting the retrieved license file is not connected to a network.

4. The method of claim 1, wherein the plurality of restriction criteria includes at least one of whether the requested license is only valid during a peak usage time span and whether the requested license is valid during an off-peak usage time span.

5. The method of claim 1, further comprising:
    receiving a license request from a user to borrow a license from a central licensing system, wherein the license request include the plurality of borrowing information;
    creating a license file based on the plurality of borrowing information within the received license request;
    scheduling a plurality of time periods to encumber the license within the central licensing system; and
    transmitting the created license file.

6. The method of claim 1, wherein the plurality of usage information includes at least one of an amount of time the software program is open and a current date and a current time according to a plurality of clock settings on the computer.

7. A computer system for borrowing licenses, the computer system comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
    retrieving a license file associated with a software program from a data storage device, wherein the license file includes a plurality of borrowing information, wherein the plurality of borrowing information includes at least one of a total usage time a requested license will be used offline, a date and a time when a borrowing user will return the requested license, a scope of the requested license, an expiration date and an expiration time at which the requested license will be revoked, and a plurality of restriction criteria associated with the requested license;
    recording a plurality of usage information to the data storage device based on a plurality of user interactions with the software program;
    updating the plurality of borrowing information within the retrieved license file using the recorded plurality of usage information; and
    revoking the retrieved license file based on the updated plurality of borrowing information expiring.

8. The computer system of claim 7, further comprising:
    receiving the license file from a central licensing system; and
    storing the received license file in a data storage device.

9. The computer system of claim 7, wherein retrieving the license file is based on a determination that a computer hosting the retrieved license file is not connected to a network.

10. The computer system of claim 7, wherein the plurality of restriction criteria includes at least one of whether the requested license is only valid during a peak usage time span and whether the requested license is valid during an off-peak usage time span.

11. The computer system of claim 7, further comprising:
    receiving a license request from a user to borrow a license from a central licensing system, wherein the license request include the plurality of borrowing information;
    creating a license file based on the plurality of borrowing information within the received license request;
    scheduling a plurality of time periods to encumber the license within the central licensing system; and
    transmitting the created license file.

12. The computer system of claim 7, wherein the plurality of usage information includes at least one of an amount of time the software program is open and a current date and a current time according to a plurality of clock settings on the computer.

13. A computer program product for borrowing licenses, the computer program product comprising:
    one or more computer-readable non-transitory tangible storage medium and program instructions stored on at least one of the one or more non-transitory tangible storage medium, the program instructions executable by a processor, the program instructions comprising:

program instructions to retrieve a license file associated with a software program from a data storage device, wherein the license file includes a plurality of borrowing information wherein the plurality of borrowing information includes at least one of a total usage time a requested license will be used offline, a date and a time when a borrowing user will return the requested license, a scope of the requested license, an expiration date and an expiration time at which the requested license will be revoked, and a plurality of restriction criteria associated with the requested license;

program instructions to record a plurality of usage information to the data storage device based on a plurality of user interactions with the software program;

program instructions to update the plurality of borrowing information within the retrieved license file using the recorded plurality of usage information; and program instructions to revoke the retrieved license file based on the updated plurality of borrowing information expiring.

14. The computer program product of claim 13, further comprising:

program instructions to receive the license file from a central licensing system; and program instructions to store the received license file in a data storage device.

15. The computer program product of claim 13, wherein retrieving the license file is based on a determination that a computer hosting the retrieved license file is not connected to a network.

16. The computer program product of claim 13, wherein the plurality of restriction criteria includes at least one of whether the requested license is only valid during a peak usage time span and whether the requested license is valid during an off-peak usage time span.

17. The computer program product of claim 13, further comprising:

program instructions to receive a license request from a user to borrow a license from a central licensing system, wherein the license request include the plurality of borrowing information;

program instructions to create a license file based on the plurality of borrowing information within the received license request;

program instructions to schedule a plurality of time periods to encumber the license within the central licensing system; and program instructions to transmit the created license file.

* * * * *